United States Patent
Harada

(10) Patent No.: US 12,400,378 B2
(45) Date of Patent: Aug. 26, 2025

(54) PRESS MACHINE AND METHOD OF DISPLAYING OPERATING STATE OF PRESS MACHINE

(71) Applicant: AIDA ENGINEERING, LTD., Sagamihara (JP)

(72) Inventor: Yasuhiro Harada, Sagamihara (JP)

(73) Assignee: AIDA ENGINEERING, LTD., Sagamihara (JP)

( * ) Notice: Subject to any disclaimer, the term of this patent is extended or adjusted under 35 U.S.C. 154(b) by 0 days.

(21) Appl. No.: 17/724,206

(22) Filed: Apr. 19, 2022

(65) Prior Publication Data

US 2022/0342391 A1 Oct. 27, 2022

(30) Foreign Application Priority Data

Apr. 27, 2021 (JP) .................................. 2021-074660
Mar. 29, 2022 (JP) .................................. 2022-053704

(51) Int. Cl.
*G06T 11/20* (2006.01)
*G05B 19/4155* (2006.01)
*G06F 3/14* (2006.01)
*G06T 11/00* (2006.01)

(52) U.S. Cl.
CPC ........ *G06T 11/206* (2013.01); *G05B 19/4155* (2013.01); *G06F 3/14* (2013.01); *G06T 11/001* (2013.01); *G05B 2219/45142* (2013.01)

(58) Field of Classification Search
None
See application file for complete search history.

(56) References Cited

U.S. PATENT DOCUMENTS

| | | | |
|---|---|---|---|
| 10,482,211 B1* | 11/2019 | Saint-Marcel | G06F 3/04847 |
| 2001/0039871 A1* | 11/2001 | Ono | G10H 1/0058 |
| | | | 84/600 |
| 2012/0078404 A1* | 3/2012 | Saito | G05B 19/4184 |
| | | | 700/97 |
| 2012/0120078 A1* | 5/2012 | Hubbard | G06F 11/3055 |
| | | | 345/440.2 |
| 2016/0110983 A1 | 4/2016 | Gandhi et al. | |
| 2017/0031329 A1 | 2/2017 | Inagaki et al. | |

(Continued)

FOREIGN PATENT DOCUMENTS

| | | |
|---|---|---|
| JP | H02-193299 A | 7/1990 |
| JP | 2001293761 | * 10/2001 |

(Continued)

OTHER PUBLICATIONS

Extended European Search Report issued in the corresponding European Application No. 22169946.5 dated Oct. 6, 2022.

(Continued)

*Primary Examiner* — Sarah Le
(74) *Attorney, Agent, or Firm* — Rimon P.C.

(57) ABSTRACT

A press machine is a press machine configured to press a workpiece. The press machine includes a display that displays a state display image which extends in a band shape and indicates an operating state of the press machine during a predetermined period of time up to date. The display displays time series variation in the operating state during the predetermined period of time by variation in a color of the state display image in the band shape in an extending direction.

9 Claims, 7 Drawing Sheets

(56) References Cited

U.S. PATENT DOCUMENTS

| | | |
|---|---|---|
| 2017/0217116 A1 | 8/2017 | Takeuchi |
| 2018/0101466 A1* | 4/2018 | O'Dowd ............... G06F 11/302 |
| 2018/0129589 A1 | 5/2018 | O'Dowd et al. |
| 2018/0232338 A1 | 8/2018 | Tasaki |
| 2019/0108117 A1 | 4/2019 | O'Dowd et al. |
| 2019/0179728 A1 | 6/2019 | O'Dowd et al. |
| 2019/0265657 A1 | 8/2019 | Inagaki et al. |
| 2020/0114608 A1 | 4/2020 | Harada |
| 2020/0167265 A1 | 5/2020 | O'Dowd et al. |
| 2020/0167266 A1 | 5/2020 | O'Dowd et al. |
| 2021/0211038 A1* | 7/2021 | Healy ....................... H03F 3/68 |

FOREIGN PATENT DOCUMENTS

| | | | |
|---|---|---|---|
| JP | 2002351416 | * | 12/2002 |
| JP | 2009-70052 A | | 4/2009 |
| JP | 2017-120649 A | | 7/2017 |
| JP | 2017-142624 A | | 8/2017 |
| JP | 2019-072728 A | | 5/2019 |
| JP | 2020-503576 A | | 1/2020 |
| JP | 2020-062650 A | | 4/2020 |
| JP | 2021-006953 A | | 1/2021 |
| WO | 2016/027645 A1 | | 2/2016 |

OTHER PUBLICATIONS

Office Action dated Feb. 15, 2024 issued in the corresponding European Patent Application No. 22169946.5.

Office Action dated on Mar. 19, 2024 issued in the corresponding Japanese Patent Application No. 2022-053704, w/ English Translation.

Office Action issued on Jul. 23, 2024 in connection with Japanese Patent Application No. 2022-053704, w/ English Translation.

* cited by examiner

PRESS MACHINE AND METHOD OF DISPLAYING OPERATING STATE OF PRESS MACHINE

CROSS REFERENCE TO RELATED APPLICATIONS

This application claims the benefit of Japanese patent application No. 2021-074660 filed on Apr. 27, 2021 and Japanese patent application No. 2022-053704 filed on Mar. 29, 2022, the entire disclosures of which Applications are hereby incorporated by reference in their entirety.

BACKGROUND

The present invention relates to a press machine and a method of displaying an operating state of the press machine.

For industrial machines, a method is available in which for increasing yield and prevention of an occurrence of serious failure, for example, an output value from a sensor monitoring the operating state of a machine is compared with a predetermined threshold value, detecting abnormality in any component based on a result of the comparison. In recent years, technologies using Artificial Intelligence (AI) have spread to industrial machines, and are expected to be used in failure prediction (JP 2017-120649 A and JP 2020-62650 A).

These failure prediction systems using AI perform machine learning using, as explanatory variables, output information from a sensor and the like which information is related to a failure in an industrial machine, for example, a press machine, to generate a learning model, and outputs failure information of the press machine and the degree of abnormality using the learning model.

The failure information and the degree of abnormality output in this case are represented by evaluation values indicating the degree of failure and the degree of abnormality, and a larger evaluation value indicates that the failure or abnormality is more likely to occur. Then, these failure prediction systems can issue a warning when the evaluation value exceeds the threshold value.

However, by using only numerical values calculated by the AI as evaluation values, numerical values related to the operating state provided by other than the AI, or the like, an operator of the press machine cannot easily determine how urgent the failure is, and also cannot easily determine which value the threshold is set to.

SUMMARY

The invention can provide a press machine that allows an operator to easily visually determine abnormality in an operating state, and also provide a method of displaying an operating state of the press machine.

According to a first aspect of the invention, there is provided a press machine configured to press a workpiece, the press machine including:
  a display configured to display a state display image which extends in a band shape and indicates an operating state of the press machine during a predetermined period of time up to date,
  the display being configured to display time series variation in the operating state during the predetermined period of time by variation in a color of the state display image in the band shape in an extending direction.

According to a second aspect of the invention, there is provided a method of displaying an operating state of a press machine including:
  displaying, on a display, time series variation in the operating state of the press machine configured to press a workpiece during a predetermined period of time up to date as variation in a color of a state display image in a band shape in an extending direction.

DESCRIPTION OF EMBODIMENTS

Figure 1:
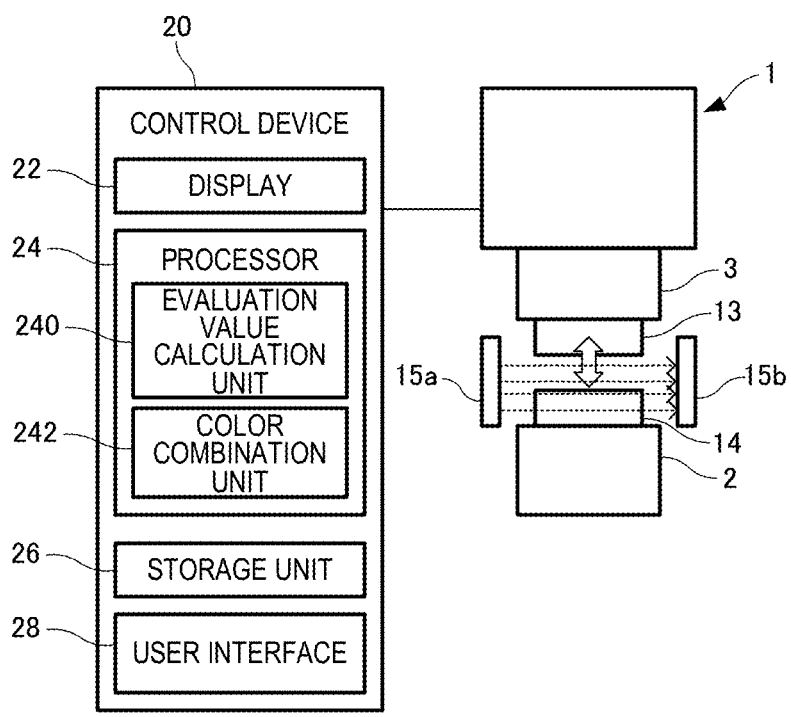
FIG. 1 is a configuration of a press machine and block diagram of a control device according to the present embodiment.

The invention has been made to solve at least part of the above problem, and can be implemented as aspects or application examples described below.

(1) According to an aspect of the invention, there is provided a press machine configured to press a workpiece, the press machine including:
  a display configured to display a state display image which extends in a band shape and indicates an operating state of the press machine during a predetermined period of time up to date,
  the display being configured to display time series variation in the operating state during the predetermined period of time by variation in a color of the state display image in the band shape in an extending direction.

According to the above aspect of the press machine, time series variation in the operating state up to date is displayed by variation in the color of the state display image in the band shape in the extending direction, allowing an operator to visually determine abnormality in the operating state of the press machine (2) In an aspect of the press machine,
  the press machine may further include a color combination unit configured to combine two or more colors corresponding to two or more types of evaluation values for evaluating the operating state per unit time, wherein
  the two or more colors may be set to gradation values corresponding to magnitudes of respective evaluation values, and
  the state display image may display colors obtained by combination by the color combination unit in a portion indicating the operating state of a current time at intervals of the unit time.

According to the above aspect of the press machine, the color combination unit combines the colors, allowing the operator to easily recognize time series variation in the operating state up to date as variation in two or more colors and in gradation values.

(3) In an aspect of the press machine,
the two or more types of evaluation values may include three types, and
the two or more colors may include three colors of red, green, and blue.

According to the above aspect of the press machine, three colors of red, green, and blue, which are three primary colors of light, corresponding to three types of evaluation values, are used, thus simplifying processing in the color combination unit to reduce a processing load.

(4) In an aspect of the press machine,
the two or more types of evaluation values may include at least one evaluation value calculated by machine learning.

According to the above aspect of the press machine, evaluation values of machine learning are reflected on the state display image, enabling a gradual increase in accuracy as an index of the operating state.

(5) In an aspect of the press machine,
the two or more types of evaluation values may include:
a degree of abnormality in the press machine calculated by machine learning;
production stability of the press machine; and
a manual operation frequency of the press machine.

According to the above aspect of the press machine, the production stability of the press machine and the manual operation frequency of the press machine are reflected on the state display image, as well as the degree of abnormality calculated by machine learning, allowing rapid variation in color to be suppressed.

(6) In an aspect of the press machine,
the two or more colors may include three colors of red, green, and blue,
a larger gradation value of the red may be assigned to a value of the degree of abnormality indicating that the operating state is in a more abnormal state,
a larger gradation value of the green may be assigned to a value of the production stability indicating that the operating state is in a more stabler state, and
a larger gradation value of the blue may be assigned to a value of the manual operation frequency indicating that the operating state is in a more stabler state.

According to the above aspect of the press machine, by combining the gradation values of the green and blue indicating a stable operating state even in a case where the value of the degree of abnormality is high and where the gradation value of the red is high, the appropriate color corresponding to the actual operating state can be displayed on the display.

(7) In an aspect of the press machine,
the state display image may include unit images continuously arranged in the extending direction, a number of the unit images being obtained by dividing the predetermined period of time by the unit time, and
each of the unit images may display the colors obtained by combination by the color combination unit at intervals of the unit time.

According to the above aspect of the press machine, the unit images are continuously arranged each of which has a width of the state display image in the band shape and a length corresponding to the unit time. This enables the operating state from a start time to the current time of a predetermined period of time to be displayed as time series variation in color at intervals of a unit time, thus allowing the operator to easily recognize variation in color.

(8) In an aspect of the press machine,
the state display image may display the operating state of a current time at one of both ends in the extending direction, and display the operating state corresponding to an elapsed time, from the one end at which the operating state of the current time is displayed toward the other end.

According to the above aspect of the press machine, the operating state corresponding to the elapsed time is displayed in the extending direction of the state display image, allowing the operator to easily recognize time series variation in the operating state.

(9) In an aspect of the press machine,
the display may be configured to display the state display image, an operation related information image of the press machine, and a degree-of-abnormality display image displaying the degree of abnormality in the press machine.

According to the above aspect of the press machine, the display displays the state display image, the operation related information image, and the degree-of-abnormality display image, allowing the operator to easily recognize the relevance of information obtained from each image.

(10) According to an aspect of the invention, there is provided a method of displaying an operating state of a press machine including:
displaying, on a display, time series variation in the operating state of the press machine configured to press a workpiece during a predetermined period of time up to date as variation in a color of a state display image in a band shape in an extending direction.

According to the above aspect of the method of displaying the operating state of the press machine, time series variation in the operating state up to date is displayed as variation in the color of the state display image in the band shape in the extending direction, allowing the operator to visually easily determine abnormality in the operating state of the press machine.

(11) In the above aspect of the method of displaying the operating state of the press machine,
the display may be configured to display the state display image, an operation related information image of the press machine, and a degree-of-abnormality display image for displaying a degree of abnormality of the press machine.

According to the above aspect of the method of displaying the operating state of the press machine, the display displays the state display image, the operation related information image, and the degree-of-abnormality display image, allowing the operator to easily recognize the relevance of information obtained from each image.

According to the above aspect of the press machine and the above aspect of the method of displaying the operating state of the press machine, time series variation in the operating state up to date is displayed as variation in the color of the state display image in the band shape in the extending direction, allowing the operator to visually easily determine abnormality in the operating state of the press machine.

Preferred embodiments of the invention will be described below in detail with reference to the drawings. Note that the embodiments described below do not unduly limit the scope of the invention described in the claims. Moreover, all of the components described below are not necessarily essential requirements of the invention.

1. Press Machine

Figure 2:
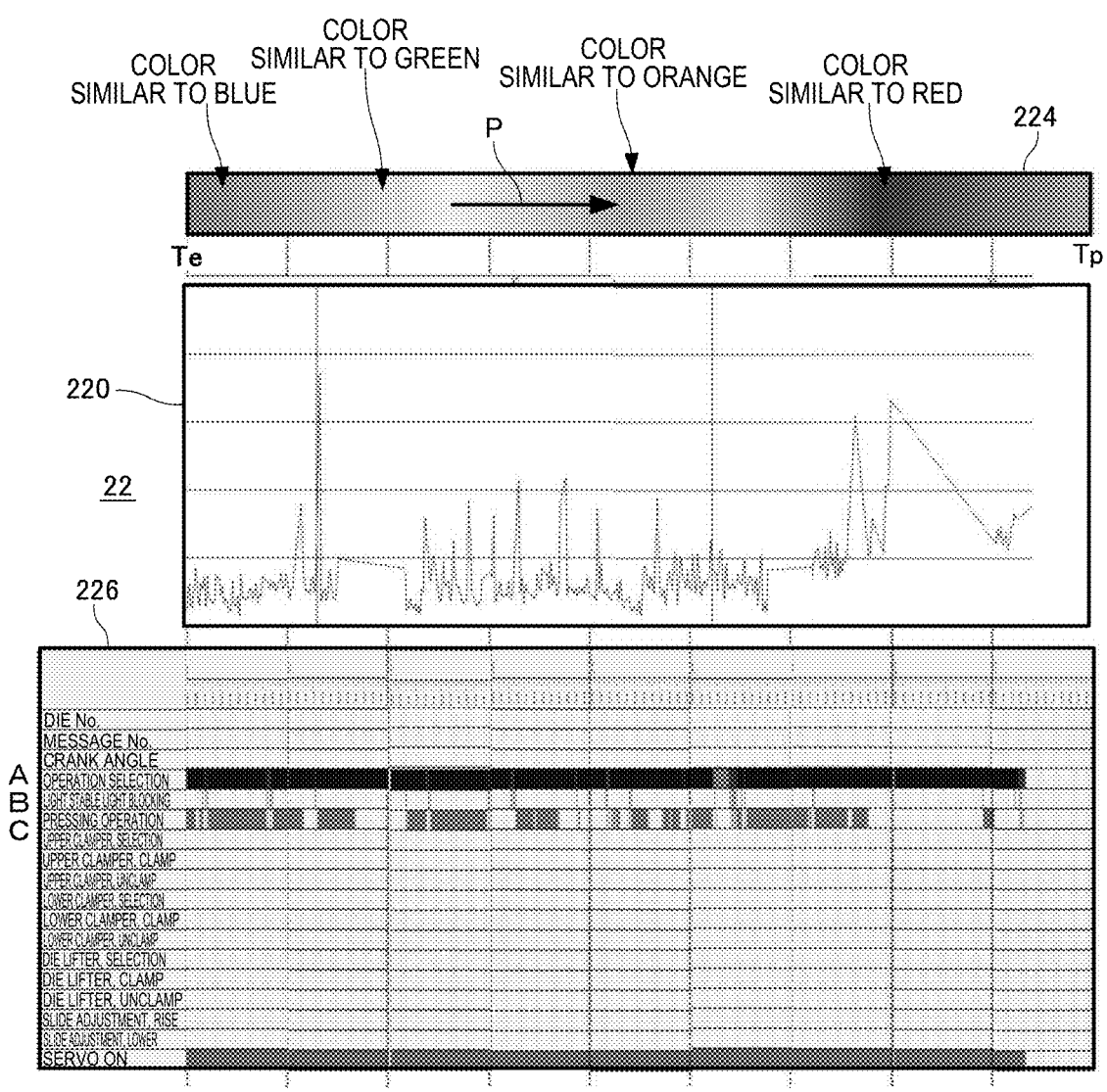
FIG. 2 is a diagram illustrating an example of a display of a press machine according to the present embodiment.

A brief overview of a press machine 1 will be described using FIGS. 1 and 2. FIG. 1 is a configuration of the press machine 1 and a block diagram of a control device 20 according to the present embodiment, and FIG. 2 is a diagram illustrating an example of a display 22 of the press machine 1 according to the present embodiment.

1-1. Overview of Press Machine

The press machine 1 in FIG. 1 is a press machine 1 that presses a workpiece. The press machine 1 includes a slide 3 that can be raised and lowered with respect to the bolster 2, a drive mechanism (not illustrated) that drives the slide 3 (e.g., a servo motor, a crankshaft, a connecting rod, or the like) and a control device 20. The press machine 1 lowers an upper die 13 fixed to the slide 3 toward a lower die 14 fixed to the bolster 2 to press the workpiece conveyed between the upper die 13 and the lower die 14. The drive mechanism may employ a known mechanism not limited to the servo motor type, and may be, for example, a mechanical press using a flywheel, or may be a linear press using a ball screw.

1-2. Control Device

The control device 20 includes a display 22, a processor 24, a storage unit 26, and a user interface 28. The control device 20 operates a drive mechanism of the press machine 1 in accordance with set press motion. The control device 20 is electrically connected to each unit of the press machine 1. The press machine 1 includes a plurality of sensors, and the control device 20 receives output signals from the sensors. For example, the press machine 1 includes a multi-optical-axis photoelectric safety device (hereinafter referred to as a "light curtain") including, as one unit, a light projector 15*a* including a plurality of light projecting elements arranged in a row, and a light receiver 15*b* corresponding to the light projector 15*a* and including a plurality of light receiving elements. When the control device 20 receives an output signal from the light receiver 15*b* for which light from the light projector 15*a* is blocked, the control device 20 forcibly stops the press machine 1.

The display 22 displays images generated by the processor 24. The display 22 will be described as a part of the control device 20, but the display 22 is not limited to this configuration, and may be physically independent of the control device 20 as a display device for displaying the operating state of the press machine 1. Such a display device may be a display of a portable terminal such as a tablet personal computer or a smartphone, for example, or the portable terminal may further include a partial function of the control device 20 such as the processor 24. In this case, both the display device and the control device 20 include a communication function for transmitting and receiving data between the display device and the control device 20. The display 22 may employ a Liquid Crystal Display (LCD), an Organic EL Display (OLED), or the like, and the display 22 may include functions of the touch panel as a part of the user interface 28.

FIG. 2 is an example of the display 22, wherein the display 22 displays a state display image 224 that extends at least in a band shape. The state display image 224 represents the operating state of the press machine 1 during a predetermined period of time up to date (a period from a time Te to the current time Tp in FIG. 2). In this regard, the operating state of the press machine 1 includes a normal operating state in which pressing is repeatedly performed in accordance with press motion and set Shots Per Minute (SPM) stored in the storage unit 26, and an abnormal operating state other than the normal operating state. The abnormal operating state may include not only abnormality in the press machine 1 itself such as emergency stop due to a failure in the servo motor, but may also include, for example, stoppage and inching operation for maintenance due to poor processing, production halt due to the lack of workpieces, stoppage of the press machine 1 due to a resting time for the operator, and the like.

The display 22 displays time series variation in the operating state during a predetermined period of time by variation in the color of the state display image 224 in the band shape in the extending direction P. The predetermined period of time may be set as desired depending on various conditions such as the operating rate of the press machine 1, a die replacement frequency, the other contents of the processing, and the like, and may be, for example, 7 days, or one year for the press machine 1 having a low failure frequency. The state display image 224 is an image displayed on the display 22 in accordance with image information calculated by the processor 24, and is updated at intervals of a unit time. The unit time may be set in accordance with a cycle with the shortest update frequency among a plurality of evaluation values described below.

By displaying time series variation in the operating state of the press machine 1 up to date by variation in the color of the state display image 224 in the band shape in the extending direction P, the operator easily determines abnormality in the operating state of the press machine 1. For example, in a case where the operator can perceive temporal variation in the occurrence frequency of an abnormal operating state by variation in color from the state display image 224, maintenance of the press machine 1 can be performed as necessary to prevent the occurrence of a critical failure.

The user interface 28 is used by the operator to input information related to operation of the press machine 1 or the like, and outputs the input information to the processor 24 and the storage unit 26. Functions of the operation unit 28 may be achieved with hardware such as a keyboard, a mouse, buttons, a touch panel, a touch pad, or the like.

The storage unit 26 functions to store programs and various types of data for causing a processor 24 to function, and also functions as a work region of the processor 24, and those functions may be achieved with a hard disk, a RAM, or the like. In the storage unit 26, information related to the operating state of the press machine 1 collected from a plurality of sensors (including the light projector 15*a* and the light receiver 15*b*), a servo controller, and the like, information related to the operating state calculated by the processor 24, and the like are stored in association with time information. The control device 20 transmits and receives various signals to and from the sensors and devices such as the servo controller.

The processor 24 can be implemented by various processors such as a Central Processing Unit (CPU). The processor 24 performs processing for pressing by executing a program or the like stored in the storage unit 26. The processor 24 includes a processing unit for displaying the operating state of the press machine 1 on the display 22, and includes, for example, an evaluation value calculation unit 240 and a color combination unit 242.

The evaluation value calculation unit 240 calculates, for example, two or more types of evaluation values for evaluating the operating state of the press machine 1 per unit time. The evaluation value is, for example, a value obtained by using a normal operating state as a reference value and weighting the reference value based on the relevance to a failure. The two or more types of evaluation values can include at least one evaluation value calculated by machine learning. By reflecting the evaluation value of machine learning on the state display image 224, the accuracy of the evaluation value as an index for the operating state can be gradually increased.

The two or more types of evaluation values can include, for example, the degree of abnormality in the press machine 1 calculated by machine learning, the production stability of the press machine 1, and the manual operation frequency of the press machine 1. Although depending on the design concept of machine learning, the degree of abnormality calculated by machine learning tends to exhibit a larger value, for example, for stoppage of the press machine 1, and may also exhibit a large degree-of-abnormality value in a case where the press machine 1 is intentionally stopped (due to the resting time for the operator or the like) regardless of abnormality. Thus, there is concern about relying only on the degree of abnormality calculated by machine learning for prediction of failure. By reflecting the production stability and the manual operation frequency of the press machine 1 as well as the degree of abnormality calculated by machine learning on the state display image 224, as described above, results reflecting actual conditions are expected to be obtained, and in particular, rapid variation in color in the state display image 224 can be suppressed.

In order to calculate evaluation values based on machine learning, the evaluation value calculation unit 240 may include, for example, a learning model generation unit, a prediction value calculation unit, a degree-of-abnormality calculation unit, and a degree-of-abnormality output unit disclosed in JP 2020-62650 A.

The learning model generation unit uses, as a response variable, one data from among the data (a plurality of data collected from a plurality of sensors of the press machine 1, data about a positional deviation, and data about a speed deviation) stored in the storage unit 26, and uses data other than the one data as explanatory variables to perform machine learning to generate a learning model for the one data, the generation being performed for all of the plurality of data, the data about the positional deviation, and the data about the speed deviation. A neural network is used for the algorithm of machine learning. However, it may be possible to employ any other algorithm as long as the algorithm corresponds to an analysis technology suitable for correlated data. The plurality of sensors include, for example, a sensor that detects a press load, a sensor that detects an output current (secondary current) of a servo amplifier of a servo motor, a sensor that detects a temperature (IGBT temperature) of the servo amplifier, a sensor that detects the temperature of a capacitor providing output to the servo amplifier, a sensor that detects a voltage across the capacitor terminals (p-n voltage), a sensor that detects the temperature (IGBT temperature) of a servo power supply, a sensor that detects an input current (primary current) to the servo power supply, a sensor that detects an ambient temperature or the temperature of a lubricating oil, and the like.

In a case where the drive mechanism of the press machine 1 is a mechanical press using a flywheel, the plurality of sensors include, for example, a sensor that detects a press load, a sensor that detects the temperature of a lubricating oil, a sensor that detects the temperatures of a clutch and a brake, a sensor that detects an output current (secondary current) from an inverter of a motor, a sensor that detects an input current (primary current) to the inverter, a sensor that detects the ambient temperature, and the like. The learning model generation unit of the mechanical press uses, as a response variable, one data from among a plurality of data collected from the plurality of sensors stored in the storage unit 26, and uses data other than the one data as explanatory variables to perform machine learning to generate a learning model for the one data, the generation being performed for all of the plurality of data.

The prediction value calculation unit inputs, to the learning model for the one data, an actually measured value of data other than one data about the plurality of data collected from the plurality of sensors, the data about the positional deviation and the data about the speed deviation collected from the servo controller, to calculate a predicted value of the one data, the calculation being performed for all of the plurality of data, the data about the positional deviation, and the data about the speed deviation. A self-diagnosis period is set to a short period of time to recognize the current operating state, and may be, for example, approximately one minute, and is set to the time for one cycle of pressing as a minimum value.

The degree-of-abnormality calculation unit calculates the degree of abnormality based on a difference between an actually measured value and a prediction value for each of the plurality of data, the data about the positional deviation and the data about the speed deviation. The degree of abnormality can be set corresponding to the gradation value of the color described below. For example, in a case where the color corresponding to the degree of abnormality has 256 gradations represented by gradation values of 0 to 255, the gradation value for the highest degree of abnormality is 255, and for this determination index, a larger gradation value indicates a more abnormal operating state of the press machine 1.

The degree-of-abnormality output unit outputs the degree of abnormality calculated by the degree-of-abnormality calculation unit. For example, the degree-of-abnormality output unit causes the display 22 to display the degree of abnormality calculated as a degree-of-abnormality display image 220. The information of the degree of abnormality calculated may be transmitted to another information processing device or server. Furthermore, in a case where the degree of abnormality calculated exceeds a predetermined threshold, the degree-of-abnormality output unit may cause the display unit 22 to display warning information (alert), or may transmit the warning information to another information processing device or server.

Additionally, the evaluation value calculation unit 240, for example, calculates an evaluation value other than the degree of abnormality based on an evaluation item other than the evaluation item used for the degree of abnormality. The evaluation values other than the degree of abnormality may include, for example, the production stability of the press machine 1 and the manual operation frequency of the press machine 1. However, any other evaluation values may be used as long as the degree of abnormality can be corrected in accordance with the actual conditions of the press machine 1. The production stability of the press machine 1 and the manual operation frequency of the press machine 1 are displayed on the display 22 as an operation related information image 226. Details of the operation related information image 226 will be described below.

The production stability of the press machine 1 is an evaluation value that represents the stability of pressing operation during the current time to a certain period of time before the current time. The period of time is set to, for example, 24 hours. The production stability is calculated based on, for example, the time for which the press machine 1 operates during this period of time and the time for which the light curtain is blocked (the light receiver 15b does not receive light from the light projector 15a). The time for which the press machine 1 operates can be measured, for example, by an output signal from an encoder of the servo motor. In addition, a reference production number may be defined as a production number per unit time, and the production stability may be calculated based on an achievement rate for the reference production number. A large calculated value of the production stability means that the operating state is stable during the period of time, or during the unit time. The production stability can be set corresponding to the gradation value of color described below. Specifically, when the color corresponding to the production stability has 256 gradations represented by gradation values of 0 to 255, the gradation value corresponding to the highest production stability is 255, and for this determination index, a larger gradation value indicates a more stable pressing operation. More specifically, as a calculation example based on the time for which light from the light curtain is blocked, the gradation value of the color is calculated to be 200 resulting from (1-780/3,600)×255=199.75 when the predetermined period of time is 60 minutes (3,600 seconds) and the light blocking time is 13 minutes (780 seconds). In addition, as a calculation example based on the achievement rate for the reference production number per unit time, the reference production number is calculated from the required production number and the SPM input by the operator in advance (unit time converted into minutes×SPM), and in a case where the achievement rate in the actual operation is 80%, the gradation value is calculated to be 204 resulting from 255×80/100=204. However, the calculation method is not limited to this.

The manual operation frequency of the press machine 1 is calculated based on the time for automatic operation and the time for manual operation during the current time to a certain period of time before the current time. The time for automatic operation can be measured by the time when the processor 24 executes processing in accordance with the slide motion, and the time for manual operation can be measured by the operation time for the user interface 28. The period of time is set to, for example, 24 hours. In addition, the automatic operation may be determined to be the time when for an operation selection switch, for example, "Safe one (safety one cycle)" and "Continuous (continuous operation)" related to production are selected, the manual operation may be determined to be the time when, for example, "Off" and "Inching (inching operation)" not related to production are selected, and a manual operation frequency may be determined to be the ratio between the time for automatic operation and the time for manual operation. However, for distinction from a case where the press machine 1 is stopped for a reason other than preset stop, that is, due to abnormality in the die and then a manual operation is performed to remove the die from the press machine 1, the time for a predetermined manual operation not considered to be abnormality in the press machine 1 itself can be excluded from the calculation of the manual operation frequency. For example, even for a manual operation, the time for an operation performed after preset stop and including operation of a die clamp and a die lifter can be determined to be the time when pre-scheduled die replacement is performed, and for prevention of adverse effects on the manual operation frequency, the time for this operation can be excluded from the calculation. In this regard, "Preset stop" refers to stoppage of the press machine 1 at a preset number of strokes (production number). A small value of the manual operation frequency refers to a small number of manual operations during the period of time and refers to a stable operating state due to a long-time automatic operation being performed. The automatic operation may also be referred to as continuous operation, and the manual operation may also be referred to as inching operation. The operation frequency can be set corresponding to the gradation value of the color described below. Specifically, in a case where the color corresponding to the operation frequency has 256 gradations represented by gradation values of 0 to 255, the gradation value corresponding to the lowest operation frequency is 255, and for this determination index, a larger gradation value indicates a more stable pressing operation. A specific calculation method for the manual operation frequency is determined as in the case of the production stability described above, but is not limited to such a method.

The color combination unit 242 combines two or more colors corresponding to two or more types of evaluation values for evaluating the operating state of the press machine 1 per unit time. By using two or more types of evaluation values, rapid variation in evaluation values can be suppressed. The colors are colors that can be expressed by the display 22, and include chromatic and achromatic colors. Here, the colors are preferably selected from among achromatic colors in view of distinguishability, and each of the colors are preferably selected to be a color located far at an angle in a hue circle. The combination of two or more colors is a so-called color mixture, and for example, additive mixing can be employed. The two or more colors are set to gradation values according to the magnitudes of evaluation values. By combining two or more colors set to gradation values according to the magnitudes of the evaluation values, temporal variation in operating state can be expressed by the gradations of at least two colors, thus allowing the operator to recognize the trend of the current operating state, for example, prediction of approaching occurrence of a failure.

The two or more types of evaluation values can include, for example, three types of values, the degree of abnormality in the press machine 1, the production stability of the press machine 1, and the manual operation frequency of the press machine 1. The two or more colors can include three colors, red, green, and blue. The use of such three primary colors allows the color combination unit 242 to combine colors using RGB commonly employed for color displays as a type of additive mixing. Thus, by using three colors of red, green, and blue, which are the three primary colors of light corresponding to three types of evaluation values, the processing in the color combination unit 242 is simplified, with the processing load reduced.

When the two or more colors are three colors of red, green, and blue, a larger gradation value of red [R] is assigned a value of the degree of abnormality indicating that the operating state of the press machine 1 is in a more abnormal state, a larger gradation value of green [G] is assigned a value of the production stability indicating that the operating state of the press machine 1 is in a more stabler state, and a larger gradation value of green [G] is assigned a value of the manual operation frequency indicating that the operating state of the press machine 1 is in a more stabler state. In this way, by combining the gradation values of the green [G] and blue [B] indicating a stable operating state even in a case where the degree of abnormality is high and where the red [R] has a high gradation value, appropriate colors depending on the real operating state can be displayed on the display.

A specific example of a color, which is obtained by combination using the three primary colors of light with 256 gradations represented by gradation values of 0 to 255 in the color combination unit 242, is light blue of [R, G, B]=[0, 255, 255] in a case where the operation is most stable. In this regard, even in a case where the value of the red [R]

indicates an abnormal state and the gradation value is close to 255, a color obtained by combination has low saturation and is similar to white, in a case where the green [G] and blue [B] are not significantly changed, with the gradation value remaining close to 255. This prevents the impression of being abnormal from being given to the operator. Also, the color is red of [R, G, B]=[255, 0, 0] in a case where the operation is most unstable. Even in a case where the value of the green [G] indicates low production stability, the value of the blue [B] indicates a high manual operation frequency, and both gradation values remain close to 0, the color has low lightness and is similar to black, in a case where the value of the red [R] indicates a normal state, with the gradation value closer to 0. This prevents the impression of being abnormal from being given to the operator. In this way, red [R] information corresponding to a main factor of an abnormal operating state and green [G] and blue [B] information corresponding to two sub-factors indicating a stable operating state function as mutual filters, and three RGB values increase and decrease with an identical trend (abnormal or stable) to provide appropriate saturation and lightness, allowing hues to be clearly identified. This allows the operator to easily determine the operating state.

Using FIG. 2, examples of the state display image 224, the degree-of-abnormality display image 220, and the operation related information image 226 will be described. The display 22 can display the state display image 224, the operation related information image 226 of the press machine 1, and the degree-of-abnormality display image 220 indicating the degree of abnormality in the press machine 1. The display 22 displays the state display image 224, the operation related information image 226, and the degree-of-abnormality display image 220, allowing the operator to easily recognize the relevance of information obtained from each image. All images are displayed using, as a horizontal axis, the time axis of the same scale, and three images are displayed at intervals in the vertical direction.

The state display image 224 is displayed on the display 22 in a color obtained by combination by the color combination unit 242. The state display image 224 is expressed by black-and-white gradation. However, since the RGB is adopted, 256 gradations of each of the three colors of red, green, and blue are actually combined for display. A portion displayed in a color similar to blue in FIG. 2 corresponds to a period that is close to a normal operating state in which the pressing operation is relatively stable, a portion displayed in a color similar to green corresponds to a period that is more unstable than the normal operating state, and a portion displayed in a color similar to orange or red corresponds to a period in which abnormality is occurring or a failure has already occurred. Warm colors such as orange and red are displayed for predicting a failure in the press machine 1, and are effective as colors that alert the operator. Note that color combinations for the evaluation values are not limited to the RGB values and that values may be used that can be converted into numerical values by a computer such as color codes expressed in hexadecimal or that the evaluation values may be expressed in a shade of black and white using a gray scale or the like.

The state display image 224 can display the color obtained by combination by the color combination unit 242 in a portion representing the current (time Tp) operating state at intervals of the unit time. The operating state of the current time (time Tp) is displayed by being updated at intervals of the unit time, allowing the operator to recognize the latest operating state. In addition, the color combination unit 242 combines colors to allow the operator to easily recognize time series variation in the operating state up to date (time Tp) by using two or more colors and gradation values and varying the colors and gradations.

The state display image 224 is an image in a band shape having a predetermined height and extending linearly in the horizontal direction. The state display image 224 can display the current (time Tp) operating state at one of both ends in an extending direction P, and display the operating state corresponding to the elapsed time (time Tp to time Te) from the one end at which the current operating condition is displayed toward the other end. In the example in FIG. 2, at the time Te, the state display image 224 is blue, but as the time Tp is closer, gradual variation in color from green through orange to red is displayed. In other words, an abnormal operating state currently (time Tp) remains, and a failure in the press machine 1 is expected. In this way, the operating state corresponding to the elapsed time is displayed along the longitudinal direction of the state display image 224, allowing the operator to recognize time series variation in the operating state.

The degree-of-abnormality display image 220 is a line graph in which the vertical axis indicates the degree of abnormality calculated by the evaluation value calculation unit 240, and in which the horizontal axis indicates time. The degree-of-abnormality display image 220 is updated at intervals of the unit time similarly to the state display image 224.

In the operation related information image 226, a plurality of items (for example, A to C) are arranged vertically, and the state of each item corresponding to the elapsed time is displayed in the horizontal direction.

An operation selection A in the operation related information image 226 displays periods of time in which the automatic operation of the press machine 1 is selected and periods of time in which the manual operation of the press machine 1 is selected. Black regions correspond to periods of time in which the automatic operation is selected, and gray regions correspond to periods of time in which the manual operation is selected. For example, the evaluation value calculation unit 240 calculates the manual operation frequency based on the information of the operation selection A.

A light stable light blocking B in the operation related information image 226 displays periods of time in which light from the light curtain of the press machine 1 is blocked. Gray regions correspond to periods of time in which the light receiver 15b fail to receive light.

A pressing operation C in the operation related information image 226 displays periods of time in which the press machine 1 is in operation and periods of time in which the press machine 1 is stopped. Gray regions correspond to periods of time in which the press machine 1 is in operation, and white regions correspond to periods of time in which the press machine 1 is stopped. The information of the light stable light blocking B is related to an operation in which the operator places the hand in the die for maintenance, and the information of the pressing operation C is related to the state in which the operation is stopped due to the resting time of the operator, a failure, maintenance, or the like. Thus, for example, the evaluation value calculation unit 240 calculates the production stability of the press machine 1 based on the information of the light stable light blocking B and the pressing operation C. The items of the operation related information image 226 are not limited to A to C described above, and appropriately include factors for calculating production stability, for example, the opening/closing time of a guard, emergency stop time, the ON/OFF time of the die clamp or the die lifter, and the like.

The example illustrated in FIG. 2 indicates the degree of abnormality (degree-of-abnormality display image 220) greatly affects stoppage of the press machine 1, but in actuality, the stoppage is often not related to the abnormality. For example, in a case where even in the period of time in which the press machine 1 is stopped, no manual operation is performed and the light curtain is inactive, then no maintenance is performed, leading to no relevance to a failure. In this way, not only the degree of abnormality but also other information related to a failure is used to calculate a plurality of evaluation values, a plurality of colors are determined from the evaluation values and combined together, and the color obtained by the combination is displayed on the state display image 224. Thus, temporal variation in color is combined with the state of the press machine 1 and with the operating state to provide display more compatible with the actual situation, allowing the operator to easily recognize temporal variation in the operating state.

Figure 3:
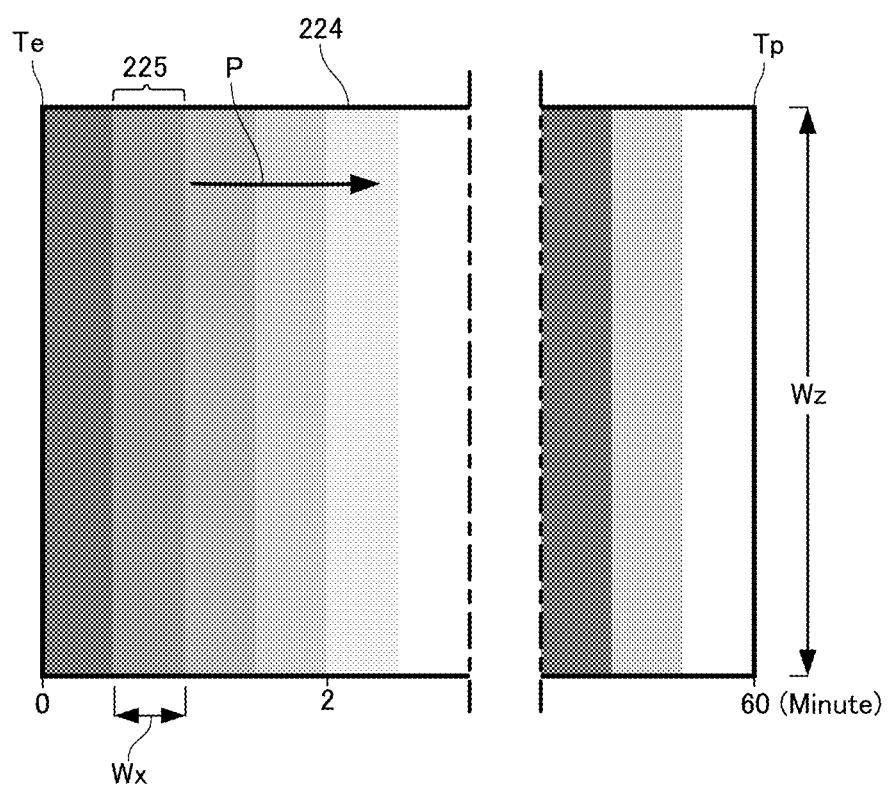
FIG. 3 is an enlarged view of a part of a state display image.

FIG. 3 is an enlarged view of a part of the state display image 224. The state display image 224 is configured such that unit images 225 are continuously arranged in the extending direction P, the number of the unit images 225 being obtained by dividing a predetermined period of time (60 minutes in an example in FIG. 3) by a unit time (30 seconds in the example in FIG. 3). Although in the example illustrated in FIG. 3, the middle of the state display image is omitted, 120 unit images 225 are continuously linearly arranged in the extending direction P. The unit time is the time at which the state display image 224 is updated. The unit image 225 is shaped like a rectangle having a length Wx in the extending direction P and a width Wz (equal to the width of the state display image 224 in the band shape) orthogonal to the extending direction P. Each of the unit images 225 displays a color obtained by combination by the color combination unit 242 at intervals of the unit time 225. By continuously arranging the unit images 225 having the width Wz of the state display image 224 in the band shape and the length Wx corresponding to the unit time, the operating state from the start time Te to the current time Tp of the predetermined period of time can be displayed as time series variation in color at intervals of the unit time. This allows the operator to easily recognize variation in color. In addition, in FIG. 3, the unit time is set to 30 seconds, but the invention is not limited to this unit time. Setting a shorter unit time allows expression of gradual variation in color, whereas setting a longer unit time enables a reduction in processing load on the control device 20.

Figure 4:
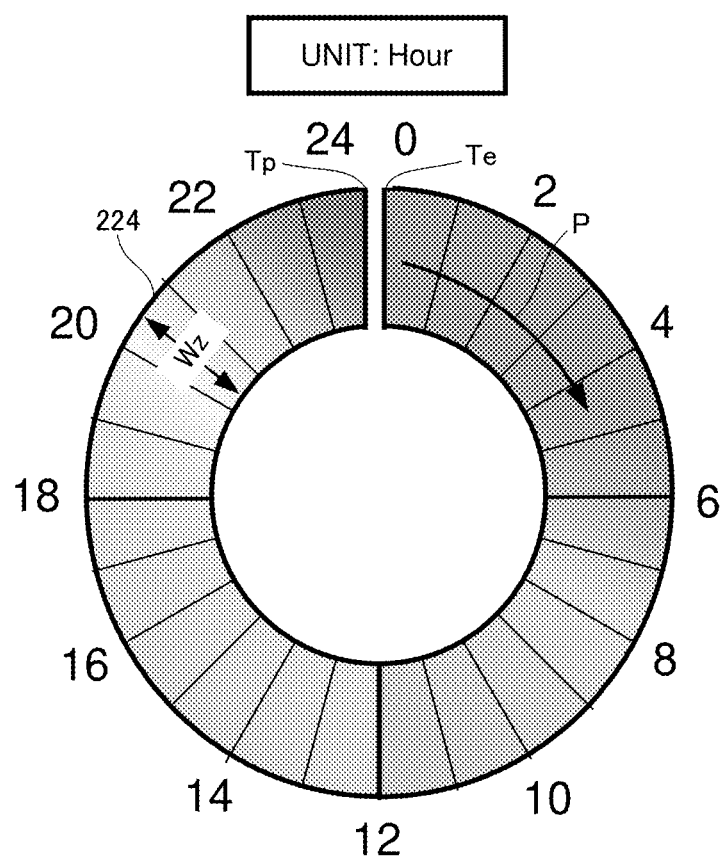
FIG. 4 is a diagram illustrating an example of another form of the state display image.
Figure 5:
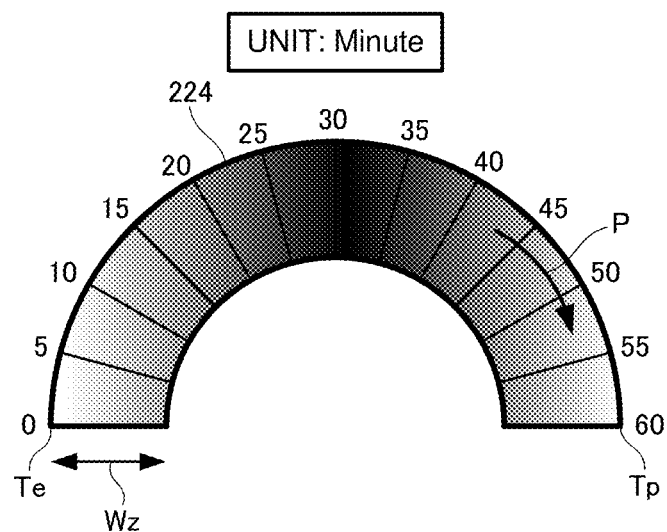
FIG. 5 is a diagram illustrating an example of another form of the state display image.
Figure 6:
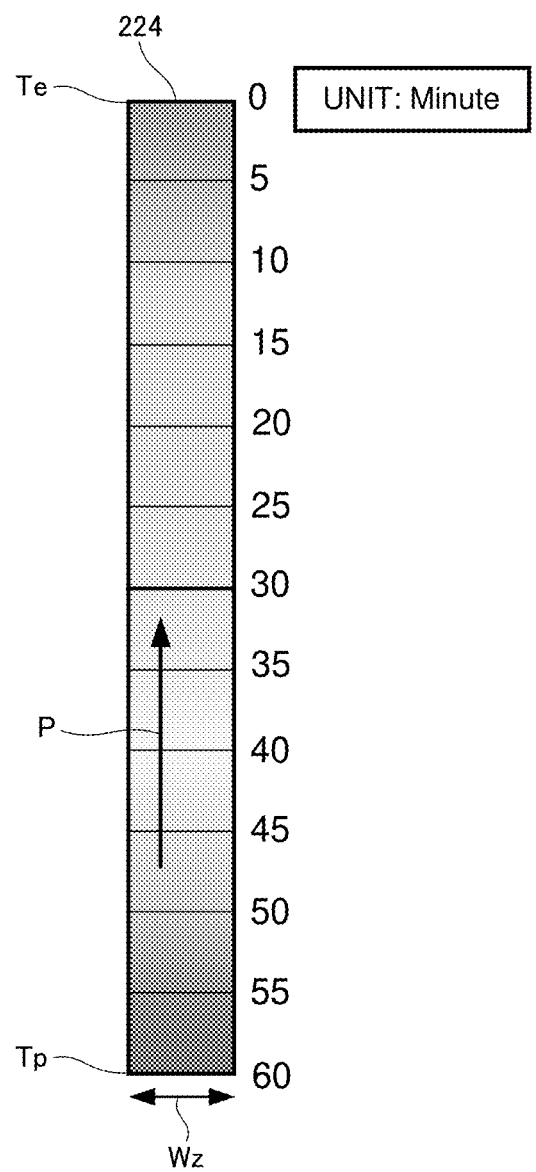
FIG. 6 is a diagram illustrating an example of another form of the state display image.

Although the state display image 224 illustrated in FIGS. 2 and 3 is shaped like a straight line extending in the horizontal direction, the invention is not limited to this state display image 224. The state display image 224 may be shaped like a ring, an arc, a straight line extending in the vertical direction, or the like. Each of FIGS. 4 to 6 is a diagram illustrating an example of another form of the state display image 224. Note that the units in FIGS. 4 to 6 are "Hour" and "Minute" but that the operator can appropriately set the units in accordance with the production state and the like and that for example, the unit can be set to "Day" and that in that case, the predetermined period of time can be set to one week, one month, several months, one year, or the like.

The state display image 224 in FIG. 4 has a band shape extending in an annular shape. In an example in FIG. 4, the time Tp and the time Te are disposed near the vertex of the ring, and both end portions of the state display image 224 are slightly spaced apart from each other at a position where the both end portions face each other. The spacing allows the operator to recognize the start time Te and the current time Tp of the predetermined period of time even in a case where the state display image 224 is shaped like a ring.

The state display image 224 in FIG. 5 has a band shape extending in an arc shape. In an example in FIG. 5, when the time Tp (60 minutes) is set to an angle of 0 degrees, at an intermediate point (30 minutes) of an arc extending upward, the angle of the vertex is 90 degrees, and at an angle of 180 degrees, the time Te (0 minutes) is reached. The arc is not limited to from 0 to 180 degrees, and may exceed 180 degrees or be less than 180 degrees.

The state display image 224 in FIG. 6 has a band shape extending linearly in the vertical direction. In an example in FIG. 6, the state display image 224 is shaped like a rectangle having a width Wz extending from the lower end time Tp to the upper end time Te.

2. Method of Displaying Operating State of Press Machine

Figure 7:
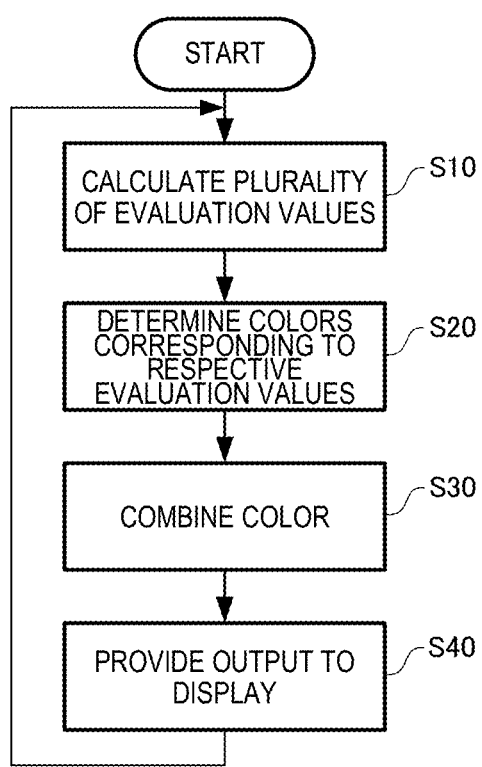
FIG. 7 is a flowchart illustrating a method of displaying an operating state of a press machine according to the present embodiment.

Using FIG. 7, a method of displaying the operating state of the press machine 1 will be described below. FIG. 7 is a flowchart of the method of displaying the operating state of the press machine 1 according to the present embodiment described in FIGS. 1 and 2.

The method of displaying the operating state of the press machine 1, illustrated in FIG. 7, includes the step (S10) of calculating a plurality of evaluation values, the step (S20) of determining colors corresponding to the respective evaluation values, the step (S30) of combining the colors, and the step (S40) of providing output to the display, the steps being repeatedly executed in this order at intervals of the unit time.

S10: The step (S10) of calculating the plurality of evaluation values includes the evaluation value calculation unit 240 calculating, for example, two or more types of evaluation values for evaluating the operating state of the press machine 1 per unit time.

S20: The step (S20) of determining the colors corresponding to the respective evaluation values includes the color combination unit 242 determining two or more colors and gradation values corresponding to the two or more types of evaluation values. S30: The step (S30) of combining the colors includes the color combination unit 242 combining the two or more colors.

S40: The step (S40) of providing output to the display includes the color combination unit 242 outputting the color obtained by combination to the display 22, and displaying, on the display 22, time series variation in the operating state of the press machine 1 during a predetermined period of time up to date, the press machine 1 pressing a workpiece, as variation in the color of the state display image 224 in the band shape in the extending direction P. By displaying time series variation in the operating state up to date in step (S40) by variation in the color of the state display image 224 in the band shape in the extending direction P, the operator can visually easily determine abnormality in the operating state of the press machine 1.

The invention is not limited to the above-described embodiments, and various kinds of modifications may be made. The invention includes configurations that are substantially the same (for example, in functions, methods and results, or in objectives and effects) as the configurations described in the embodiments. The invention also includes configurations obtained by replacing non-essential elements of the configurations described in the embodiments with other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail as in the above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A press machine configured to press a workpiece, the press machine comprising:
a display configured to display a band-shaped state display image having a length and a width, and representing an operating state of the press machine over a predetermined period of time up to a current time in a direction along the length of the band-shaped state display image,
wherein the band-shaped state display image comprises unit images arranged along the direction, and each unit image indicates the operating state of the press machine at a unit time,
wherein each of the unit images shows a color that is a mixture of two or more colors corresponding to respective two or more evaluation values for evaluating the operating state of the press machine,
wherein the two or more evaluation values are calculated based on respective different evaluation criteria,
wherein the two or more colors in each unit image are set with gradation values corresponding to magnitudes of the respective two or more evaluation values, and
wherein the display is configured to display time series variation in the operating state during the predetermined period of time based on the color varying in the direction along the length of the band-shaped state display image.

2. The press machine according to claim 1, wherein
the two or more evaluation values include three types, and
the two or more colors include three colors of red, green, and blue.

3. The press machine according to claim 1, wherein
the two or more evaluation values include at least one evaluation value calculated by machine learning.

4. The press machine according to claim 1, wherein the two or more evaluation values include:
a degree of abnormality in the press machine calculated by machine learning;
production stability of the press machine; and
a manual operation frequency of the press machine.

5. The press machine according to claim 4, wherein
the two or more colors include three colors of red, green, and blue,
a larger gradation value of the red is assigned to a value of the degree of abnormality indicating that the operating state is in a more abnormal state,
a larger gradation value of the green is assigned to a value of the production stability indicating that the operating state is in a more stabler state, and
a larger gradation value of the blue is assigned to a value of the manual operation frequency indicating that the operating state is in a more stabler state.

6. The press machine according to claim 1, wherein
the band-shaped state display image displays the operating state of a current time at one of both ends in the direction, and displays the operating state corresponding to an elapsed time, from the one end at which the operating state of the current time is displayed toward the other end.

7. The press machine according to claim 1, wherein
the display is further configured to display the band-shaped state display image, an operation related information image of the press machine, and a degree-of-abnormality display image displaying the degree of abnormality in the press machine.

8. A method of displaying an operating state of a press machine, the method comprising displaying, on a display, a band-shaped state display image having a length and a width, wherein the band-shaped state display image represents an operating state of the press machine over a predetermined period of time up to a current time in a direction along the length of the band-shaped state display image,
wherein displaying the band-shaped state display image includes arranging unit images along the direction, each unit image indicating the operating state of the press machine at a unit time,
wherein displaying the band-shaped state display image includes assigning each of the unit images a color that is a mixture of two or more colors corresponding to respective two or more evaluation values for evaluating the operating state of the press machine, wherein the two or more evaluation values are calculated based on respective different evaluation criteria,
wherein displaying the band-shaped state display image includes setting the two or more colors in each unit image with gradation values corresponding to magnitudes of the respective two or more evaluation values, and
wherein displaying the band-shaped state display image includes displaying time series variation in the operating state during the predetermined period of time based on the color varying in the direction along the length of the band-shaped state display image.

9. The method of displaying the operating state of the press machine, according to claim 8, wherein displaying the band-shaped state display image further includes an operation related information image of the press machine, and a degree-of-abnormality display image for displaying a degree of abnormality of the press machine.

* * * * *